United States Patent [19]
Yi

[11] Patent Number: 6,103,648
[45] Date of Patent: Aug. 15, 2000

[54] BULK CONDUCTING GLASS COMPOSITIONS AND FIBERS

[75] Inventor: Jay J. L. Yi, Portchester, N.Y.

[73] Assignee: Circon Corporation, Santa Barbara, Calif.

[21] Appl. No.: 09/086,717

[22] Filed: May 28, 1998

[51] Int. Cl.$^7$ .............................. C03C 3/21; C03C 13/00
[52] U.S. Cl. ................................ 501/46; 501/45; 501/35; 501/36
[58] Field of Search ................................ 501/35, 36, 37, 501/45, 46

[56] References Cited

U.S. PATENT DOCUMENTS

| | | |
|---|---|---|
| 2,494,259 | 1/1950 | Nordberg . |
| 2,920,971 | 1/1960 | Stookey . |
| 2,964,414 | 12/1960 | Dalton et al. . |
| 3,380,818 | 4/1968 | Smith . |
| 3,520,831 | 7/1970 | Trap . |
| 3,573,078 | 3/1971 | Bacon . |
| 3,589,793 | 6/1971 | Curtiss . |
| 3,885,974 | 5/1975 | Asahara et al. ........................... 501/46 |
| 3,910,796 | 10/1975 | Asahara et al. . |
| 3,957,342 | 5/1976 | Newns et al. . |
| 4,060,422 | 11/1977 | Asahara ................................... 501/46 |
| 4,342,943 | 8/1982 | Weaver ..................................... 501/46 |
| 4,996,171 | 2/1991 | Davey et al. ............................. 501/46 |
| 5,015,909 | 5/1991 | Zhong et al. . |
| 5,034,354 | 7/1991 | Fine . |
| 5,108,961 | 4/1992 | Zhong et al. . |
| 5,158,852 | 10/1992 | Fine . |
| 5,519,555 | 5/1996 | Naitoh et al. ............................. 501/45 |

FOREIGN PATENT DOCUMENTS 1 424 955  2/1976  United Kingdom .

OTHER PUBLICATIONS

*ACTA Electronica,* H.J.L. Trap, Electronic conductivity in oxide glasses, vol. 14, No. 1, 1971 pp. 41–77 (no month).
*Journal of The American Ceramic Society — Discussions and Notes,* B. Dunn, K. Ooka and J.D. MacKenzie, Secondary Electron Emission of Semiconducting Glasses, vol. 56, No. 9, circa Aug. 1973, p. 494.
*Rev. Sci. Instrum.,* J.G. Timothy, Preliminary Results with Saturable Microchannel Array Plate, vol. 45, No. 6, Jun. 1974, pp. 834–837.
*Nuclear Instruments and Methods,* Joseph Ladislas Wiza, Microchannel Plate Detectors, vol. 162, 1979, pp. 587 to 601.
*The Microchannel Image Intensifier,* Michael Lampton (Publication and date unknown).
Electronic Processes in Non–Crystalline Materials, N.F. Mott, E.A. Davis, 1979, Publisher: Clarendon Press—Oxford (no month).
*Physics and Chemistry of Glasses,* I, Kashif, S. Sh. Gomaa, A.G. Mostafa, S.M. Hamad & A.M. Sanad, Studies of some lithium borosilicate glasses containing vanadium and iron oxides, vol. 29, No. 2, Apr. 1988, pp. 72–76.
*Physics and Chemistry of Glasses,* I. Kashif, A.M. Abo–El–Azm, S. Sh. Gomaa, A.M. Sanad & E.E. Assem, Effect of heat treatment on the structure and electrical conductivity of lithium borosilicate glasses containing iron and vanadium, vol. 30, No. 5, Oct. 1989, pp. 167–171.
Elsevier Science Publishers B.V. (North–Holland), A.M. Then and C.G. Pantano, Formation and Behavior of Surface Layers on Electron Emission Glasses, Journal of Non–Crystalline Solids 120 (1990) 178–187 (no month).
Abstracts of Literature Search conducted Oct. 23, 1992.
*Physics and Chemistry of Glasses,* A. Mogus–Milankovic, B. Pivac, K. Furic & D.E. Day, Structural study of iron phosphate glasses, vol. 38, No. 2, Apr. 1997.
*IEEE Transactions on Nuclear Science,* E. Gatti, K. Ova, P. Rehak, Study of the Electric Field Inside Microchannel Plate Multipliers, vol. NS–30, No. 1, Feb. 1983, pp. 461–468.
*Journal of The American Ceramic Society,* BH. V. Janakirama–Rao, Structure and Mechanism of Conduction of Semiconductor Glasses, vol. 48, No. 6, Jun. 1965, pp. 311–319.
*Journal of the Electrochemical Society,* P.L. Baynton, H. Rawson and J.E. Stanworth, Semiconducting Properties of Some Vanadate Glasses, vol. 104, No. 4, p. 237, 1957 (no month).
*Journal of The American Ceramic Society,* J.D. Provance and J.S. Huebner, Electrically Conducting Glass Fibers, vol. 54, No. 3, p. 147 (1971) no month.
*Journal of The American Ceramic Society,* H. Hirashima, D. Arai and T. Yoshida, Electrical Conductivity of $PbO–P_2O_5–V_2O_5$ Glasses, vol. 68, No. 9, p. 486 (1985) no month.

*Primary Examiner*—Michael Marcheschi
*Attorney, Agent, or Firm*—Bradley M. Ganz

[57] ABSTRACT

A composition for a bulk conducting glass comprising $P_2O_5$, $V_2O_5$, PbO, and FeO, the ratio of the molar percentage of $P_2O_5$ to $V_2O_5$ being in the range of about 1 to about 6, and the $P_2O_5$ and $V_2O_5$ being present in an aggregate amount of at least about 50 mole percent, the PbO being present in the glass in an amount in excess of 15 mole percent, and the FeO being present in amount of about 0 to about 30 mole percent. The composition may also include MnO or $Sb_2O_3$ in an amount of up to about 2 mole percent. The composition may be formed into fibers for use in microchannel plates and other devices where bulk conductivity in glass is advantageous.

28 Claims, No Drawings

BULK CONDUCTING GLASS COMPOSITIONS AND FIBERS

BACKGROUND OF THE INVENTION

This invention relates to novel bulk electronically conducting glasses or "semi-conducting" oxide glasses. More particularly, the invention relates to novel glasses with bulk electronic conduction suitable for making microchannel electron multipliers, conducting faceplates, printer fibers, intensifiers, detectors, and electro-optical devices.

The common oxide glasses are mostly dielectrics. Under high electric fields they may support low levels of conduction based on electrolysis with ion mass transfer. This class of glasses is not suitable for use in microchannel plates unless it receives a surface heat treatment with hydrogen. This process step converts a thin surface layer to provide electron conduction, which is necessary for device application. For example, a glass containing lead oxide can be reduced in hydrogen to give a thin surface layer of electronically conducting lead. In such glasses, the bulk resistivity of the glass substrate remains high and the conduction mechanism remains ionic. The surface layer, however, is in an activated state, and becomes unstable under electron bombardment. Many practical problems arise from this material behavior.

A "bulk conducting glass" (hereinafter referred to as "BC glass") may be generally characterized in that (a) electrical conduction occurs predominantly by electrons (and/or holes) rather than by ions, and (b) the temperature coefficient of resistivity is negative.

Certain oxide glasses containing transition metal ions, such as $V^{+5}/V^{+4}$ and $Fe^{+2}/Fe^{+3}$, have electronic conduction. The conduction mechanism is the hopping process as explained by the Mott theory. Unlike covalent semiconductors such as doped Si and Ge, these oxide glasses (BC glass) have low conductivity. However, BC glass has a higher conductivity than common oxide glasses, and higher secondary electron emission coefficients than covalent semiconductors. They are believed to be good candidate materials for electron multiplication applications in such devices as gamma-ray ion detectors and night-vision imagers.

Baynton et al first reported that a family of $V_2O_5P_2O_5$ glasses was bulk electronically conducting rather than ionically conducting (J. Electrochem. Soc., Vol. 104, p. 237, 1957). The first widely studied systems were those containing $V_2O_5$ and $Fe_3O_4$, their conductivity was considered as "hopping" of electrons or vacancies between transition metal ions of different valance $V^{+5}/V^{+4}$ and $Fe^{+2}/Fe^{+3}$.

Novel glass compositions (i) with bulk electronic conduction (ii) suitable for making conducting faceplates, printer fibers, multichannel electron multipliers and other electro-optical devices are highly desirable for several reasons. For example, printer fibers of BC glass can be made much easier than those of metal wire with coatings. The diameter of glass fiber can be drawn down to several microns, so the glass fiber is more flexible and the print has better resolution. Also, existing multichannel electron multipliers are made of surface-conducting glass, which can suffer from local overheating at the surface level. If multipliers were made of bulk-conducting glass, local overheating at the surface layer of the glass and ion feed back due to electric field would be reduced. Channel multipliers made of BC glass would also have higher electron gain, wider dynamic signal range, and longer service life.

Workability is an important factor to the formation of fibers for use in applications such as microchannel plates. The fibers used in microchannel plates range from 6–100 μm and have length to diameter ratios (α) of between about 40 to about 100. Unfortunately, BC glass compositions based on vanadium-phosphate have not been suitably developed for use in commercial applications.

For example, U.S. Pat. No. 3,520,831 and U.S. Pat. No. 3,910,796 describe glass compositions having specific amounts of $V_2O_5$ and $P_2O_5$, as well as other specific ingredients. Notably, the '831 patent relates to surface coatings based on vanadium and phosphate compositions: the patent does not teach or suggest bulk conducting glass compositions that can be drawn into fine structures such as a fiber suitable for a microchannel plate. The '796 patent discloses specific BC-glass compositions based on vanadium-phosphate, but the patent also expressly directs that lead oxide, PbO, in the compositions, should not exceed 15 Mole % or the glass will have an inadequately high resistance to current. Unfortunately, contrary to the teachings of the present invention, this restriction on the amount of PbO is not necessary, and is a drawback that limits how workable the glass is. The use of PbO in excess of 15% is in fact necessary to the formation of a workable glass, and as taught herein, can be formulated into vanadium-phosphate glass compositions in excess of 15% without creating inadequately high resistance to current.

Accordingly, the prior art has not provided BC glass compositions that have good electrical properties, and that are workable into fibers, and further into microchannel plates, and other structures.

SUMMARY OF THE INVENTION

The present invention overcomes the disadvantages of the prior art in providing novel glasses (i) with bulk electronic conduction (ii) suitable for applications where such glasses are useful, including multichannel electron multipliers, conducting faceplates, printer fibers, intensifiers, detectors, and electro-optical devices.

Some of the ways the invention overcomes the disadvantages in the prior art include:

It does not require firing for hydrogen reduction of lead to create a surface conduction layer.

It inherently provides desired secondary emission properties and conductivity for a desired application, based on the formulation.

The inherent conductivity does not change during the heating processes such as fiber drawing and fusing.

It is workable into tubes, fibers, and other shapes for a variety of desired applications.

It has reduced ion feedback in devices, such as microchannel plates under an electric field.

It eliminates or reduces the need for a barrier film to block positive ions to protect the photocathode thereby further enabling higher efficiency multipliers, including night vision devices.

The glass can be formulated with amounts of PbO in excess of 15% to provide a glass with both good working properties and suitable electrical properties.

These and other advantages of the invention will be apparent to persons skilled in the art.

The novel glass compositions of this invention include vanadium and phosphate oxides glass and range in electric resistivity from about $1\times10^7$ to about $10^{12}$ ohm-cm at room temperature (25° C.). The compositions have working properties comparable with the working properties of existing surface-conducting glasses for microchannel electron multipliers.

Generally speaking, increasing or decreasing the amount of iron or vanadium in a composition varies its conductivity. Increasing one or both metals will tend to increase conductivity.

In one embodiment of the invention, the novel glass compositions displaying the desired properties include $P_2O_5$ and $V_2O_5$, with the ratio of the mole percentage (Mole %) of $P2O_5$ to $V_2O_5$ ($P_2O_5/V_2O_5$) being in the range of about 1 to about 6. In addition, the $P_2O_5$ and $V_2O_5$ are present in the composition in an aggregate amount of at least about 50 Mole %. The composition should also include an appropriate amount of PbO to promote the workability of the glass. PbO should be present in the glass in an amount in excess of 15 Mole %. It is also advantageous to include in the composition an iron oxide, FeO, in an amount of at least about 8 to about 28 Mole %. The resulting glass will be workable with good electrical properties and good secondary electron emission properties.

In another embodiment of this invention, $P_2O_5$ is present in an amount of about 38 to about 55 Mole %, and the $V_2O_5$ is present in amount of about 12 to about 33 Mole %. In this composition, PbO is present in an amount of at least about 15 Mole % to about 19 Mole %. FeO is present in this composition in amount of about 10 to about 20 Mole %. Preferably, FeO is present in amount of about 17 to about 23 Mole %.

This invention also contemplates an embodiment where the $P_2O_5$ is present in an amount of about 36 to about 40 Mole %, and the $V_2O_5$ is present in amount of about 32 to about 35 Mole %. In this composition, PbO may be present in an amount of at least about 16 Mole % to about 19 Mole %. FeO may be present in this composition in amount of about 8 to about 28%. Preferably, FeO is present in an amount of about 12 to about 5 Mole %.

The foregoing embodiments may also include $Sb_2O_3$ and MnO. Preferably $Sb_2O_3$ is present in an amount of about 0 to about 2 Mole %, and MnO is present in an amount of about 0 to about 2 Mole %. It is believed that when at least one or both of these oxides are present in the compositions they improve the stability of the BC glass during various glass processing conditions.

The foregoing embodiments and additional embodiments are described in further detail below.

DETAILED DESCRIPTION OF THE INVENTION

As used herein, including in the attached claims, reference to glass compositions having particular mole percent values for ingredients is intended to refer to the molar percentages of the starting ingredients used for glass formation. It is generally the case that the compositional percentages are substantially maintained in the formed glass. It is also intended that references to a particular oxide mean that particular oxide or an equivalent oxide for maintaining the same ratio of elements in the glass composition.

The novel phosphate glass compositions of the present invention are suitable for commercial applications. They are generally based on phosphate and vanadium oxides in particular amounts. The compositions of this invention include $P_2O_5$ and $V_2O_5$, with the ratio of the mole percentage of $P_2O_5$ to $V_2O_5$ ($P_2O_5/V_2O_5$) being in the range of about 1 to 6, and the $P_2O_5$ and $V_2O_5$ being present in the composition in an aggregate amount of at least about 50 Mole %.

A composition made according to this invention should also include an appropriate amount of lead oxide to promote the workability of the glass. In contrast to certain teachings in the prior art, e.g., U.S. Pat. No. 3,910,796, it has been found that PbO should be present in the composition in an amount in excess of 15 Mole %. Using the formulations taught herein a glass with good electrical properties and good secondary emission properties is produced even when PbO is in excess of 15 Mole %. A preferred range of PbO is from about 15 to about 30 Mole %. Preferably, PbO is present in an amount of about 17 to about 23 Mole %.

The compositions of this invention should also include an appropriate amount of an iron oxide to contribute to the conductive properties of the glass. It is preferred that compositions made according to his invention include FeO in an amount of up to about 30 Mole %. In one embodiment, FeO is present in an amount of at least about 8 to about 28 Mole %. In another embodiment, FeO is preferably present in amount of about 12 Mole % to about 15 Mole %.

This invention also contemplates a composition where the $P_2O_5$ is present in an amount of about 38 to about 55 Mole %, and the $V_2O_5$ is present in amount of about 12 to about 33 Mole %. In this composition, PbO may be present in an amount of at least about 15 Mole % to about 30 Mole %. Preferably, the PbO is present in amount of about 16 to about 19 Mole %. FeO may be present in this composition in amount of about 8 to about 28% Mole %. Preferably, FeO is present in amount of about 17 to about 23 Mole %.

This invention further contemplates a composition where the $P205$ is present in an amount of about 36 to about 40 Mole %, and the $V_2O_5$ is present in amount of about 32 to about 35 Mole %. In this composition, PbO may be present in an amount of at least about 15 Mole % to about 30 Mole %. Preferably, the PbO is present in amount of about 16 to about 19 Mole %. FeO may be present in this composition in amount of about 8 to about 28% Mole %. Preferably, FeO is present in amount of about 12 to about 15 Mole %.

It is believed that the foregoing disclosure independently teaches glass composition formulations that may be used in practical applications. To help confirm that glass with appropriate properties could be formed according to this invention, Examples 1–5 in the Tables below were prepared and tested.

TABLE 1

| CHEMICAL COMPOSITION(MOLE %) | EXAMPLES 1–4 | | | |
|---|---|---|---|---|
| | No. 1 | No. 2 | No. 3 | No. 4 |
| $P_2O_5$ | 38 | 45 | 49 | 55 |
| $V_2O_5$ | 33 | 14 | 21 | 10 |
| FeO | 12 | 19 | 11 | 10 |
| PbO | 17 | 21 | 19 | 23 |
| MnO | — | 1 | — | — |
| $Sb_2O_3$ | — | — | — | 2 |
| Coefficient of Thermal Expansion ($\times 10^{-7}/°$ C.) | 81 | — | 77 | 90 |
| Transition temperature (Tg ° C.) | 410 | — | 530 | — |
| Softening Point (on thermal expansion curve) (Mg ° C.) | 450 | — | 570 | — |
| Bulk electric resistivity (ohms-cm) | $5 \times 10^7$ | $9 \times 10^9$ | — | $3 \times 10^{11}$ |
| Density (g/cm$^3$) | 3.41 | — | 3.57 | — |

EXAMPLE 5

The following example in TABLE 2 is for a range of compositions that are believed to be useful to produce a BC glass as a sensor of high-energy signal flux. (Conventional surface conducting glasses are known to burn out when used as sensors for high-energy signal flux.):

TABLE 2

| CHEMICAL COMPOSITION | (MOLE %) |
|---|---|
| $P_2O_5$ | 36–40 |
| $V_2O_5$ | 32–35 |
| FeO | 12–15 |
| PbO | 16–19 |

A glass was prepared according to Table 2. The glass was then tested to determine certain material properties. The properties tested and the results are listed in TABLE 3 below.

TABLE 3

| Coefficient of Thermal Expansion ($\times 10^{-7}/°$ C.) | 81 |
|---|---|
| Transition Temperature (Tg ° C.) | 410 |
| Fiber Drawing Temperature (° C.) | 580–600 |
| Bulk Electric Resistivity (ohms-cm) | $5 \times 10^7$ |
| Density (g/cm$^3$) | 3.41 |

The components used in the compositions of this invention may be prepared from appropriate raw materials in proportions to supply specific amounts of oxide components by standard melting practices. Glass is obtained by melting a mixture of the relevant oxides in a crucible, according to standard, known techniques. In general, glass is melted by mixing the ingredients and melting them in a crucible. Suitable crucibles for melting phosphate glasses include zirconia, kyanite, $SiO_2$, and ceramic crucibles.

The glass is melted at a temperature of from about 1250° C. to about 1350° C. for about 8 hours. The glass is cooled to the transformation temperature ($T_g$) and annealed. The annealing process preferably involves two steps: (1) an initial period of slow cooling down to about 50° C. below $T_g$ with a cooling rate of about 4° C./hour and (2) a further cooling down by about 50° C. with a cooling rate of about 7° C./hour.

It is preferred that the BC glass be stirred and re-melted to promote homogeneity in the glass.

As another novel feature of this invention, adding a small amount of $Mn^{+3}/Mn^{+2}$ or $Sb^{+5}/Sb^{+3}$ to the composition mixture is believed to stabilize the conductive behavior of the glass. With one or both ingredients, the composition is less affected by processing conditions such as variations in temperature and atmosphere. Preferred amounts of these ingredients in mole percent are about 0 to about 2% MnO and about 0 to about 2% $Sb_2O_3$.

The casting of the glass is generally carried out according to standard techniques. To produce cleaner fibers from the novel BC-glass compositions of this invention, a copper-based alloy mold may be used to cast rods and slabs of BC glass.

The BC glass compositions may be drawn into fibers, assembled, and fused into microchannel plates using standard techniques. For example, such techniques are described in U.S. Pat. Nos. 5,015,909, and 5,108,961. Columns 5–10 and associated FIGS. 1–13 of the '909 patent, and columns 5–11 and associated FIGS. 1–13 of the '961 patent, are expressly incorporated herein by reference for their teachings on producing optical fibers, including formation of glass fiber with core and clad layer, and formation of a fused bundle composed of a plurality of soluble cores encompassed in a continuous bulk-conducting glass matrix, and general production of microchannel plates.

What is claimed is:

1. A bulk conducting glass composition comprising: $P_2O_5$, $V_2O_5$, PbO, and FeO, each having a predetermined molar percentage, the ratio of the molar percentage of $P_2O_5$ to $V_2O_5$ being in the range of greater than 1 to about 6, and the $P_2O_5$ and $V_2O_5$ being present in an aggregate amount of at least 50 Mole %, the PbO being present in the glass in an amount of 16 to 28 Mole %, and the FeO being present in an amount of about 8 to about 30 Mole %.

2. The composition of claim 1 wherein the FeO is present in an amount of about 10 to about 20 Mole %.

3. The composition of claim 2 wherein the PbO is present in an amount of about 17 to about 23 Mole %.

4. The composition of claim 2 wherein the FeO is present in an amount of about 12 to about 15 Mole %.

5. The composition of claim 3 wherein the PbO is present in an amount of about 17 to about 23 Mole % and the composition further including MnO and/or $Sb_2O_3$ in an aggregate amount of at least 1 Mole %.

6. A bulk conducting glass composition comprising:
$P_2O_5$, $V_2O_5$, FeO, and PbO, each having a predetermined molar percentage, the molar percent ratio of $P_2O_5$ to $V_2O_5$ being within the range of greater than 1 to about 6, and the $P_2O_5$ being present in an amount of at least 30 Mole %, and $V_2O_5$ being present in amount of at least 10 Mole %; and the FeO being present in the composition in an amount of about 8 to about 28 Mole %; and the PbO being present in the composition in an amount of 16 to about 30 Mole %.

7. The composition of claim 6 wherein the FeO is present in an amount of about 12 to 15 about Mole %.

8. The composition of claim 6 wherein the PbO is present in an amount of about 16 to about 19 Mole %.

9. The composition of claim 6 wherein the $P_2O_5$ is present in an amount of about 36 to about 40 Mole %, the $V_2O_5$ is present in amount of about 32 to about 35 Mole %.

10. The composition of claim 6 wherein the PbO is present in an amount of about 17 to about 23 Mole %.

11. A bulk conducting glass composition comprising the following components in about the following Mole %:
$P_2O_5$ 38–55%;
$V_2O_5$ 12–33%;
FeO 10–20%; and
PbO 16–19%.

12. A bulk conducting glass composition comprising the following components in about the following Mole %:
$P_2O_5$ 36–40%;
$V_2O_5$ 32–35%;
FeO 12–15%; and
PbO 16–19%.

13. The composition of claim 1, wherein the $P_2O_5$, $V_2O_5$, and PbO are present in an amount sufficient to result in a glass having at least a coefficient of thermal expansion of about 75–95$\times 10^{-7}/°$ C., a transition temperature of 400–550° C., a bulk electric resistivity of at least $1 \times 10^7$ ohm-cm, and a density of at least 3.2 g/cm$^3$.

14. The composition of claim 9 wherein the FeO is present in an amount of at least 12 to about 15 Mole %.

15. A glass fiber formed from a glass having a composition comprising:
$P_2O_5$ and $V_2O_5$, and PbO, and FeO, each having a molar percentage, the ratio of the molar percentage of $P_2O_5$ to $V_2O_5$ being in the range of greater than 1 to about 6, and the $P_2O_5$ and $V_2O_5$ being present in an aggregate amount of at least 50 Mole %, the PbO being present in the glass in an amount of at least 16 Mole %, and the FeO being present in amount of about 8 to about 28%.

16. The fiber of claim 15 wherein the FeO is present in an amount of about 10 to about 20 Mole %.

17. The fiber of claim 15 wherein the FeO is present in an amount of about 12 to about 15 Mole %.

18. The fiber of claim 15 wherein the PbO is present in an amount of about 17 to about 23 Mole %.

19. A glass fiber formed from a glass having a composition comprising:

$P_2O_5$, $V_2O_2$, FeO, and PbO, each having a molar percentage, the molar percent ratio of $P_2O_5$ to $V_2O_5$ being within the range of greater than 1 to about 6, and the $P_2O_5$ being present in an amount of at least 30 Mole % and the amount of the $V_2O_5$ being present in amount of at least 10 Mole %; and the FeO being present in the composition in an amount of about 8 to about 28 Mole %; and the PbO being present in the composition in an amount of 16 to about 30 Mole %.

20. The fiber of claim 19 wherein the FeO is present in an amount of about 12 to about 15 Mole %.

21. The fiber of claim 19 wherein the PbO is present in an amount of about 17 to about 23 Mole %.

22. The composition of claim 19 wherein the $P_2O_5$ is present in an amount of about 36 to about 40 Mole %, and the $V_2O_5$ is present in amount of about 32 to about 35 Mole %.

23. The fiber of claim 19 wherein the glass comprises the following components in about the following Mole %:

$P_2O_5$ 36–40%;
$V_2O_5$ 32–35%;
FeO 12–15%; and
PbO 16–19%.

24. The fiber of claim 15, wherein the $P_2O_5$, $V_2O_5$, and PbO are present in an amount sufficient to result in a glass having at least a coefficient of thermal expansion of about $75 \times 10^{-7}/°$ C. to about $95 \times 10^{-7}/°$ C., a transition temperature of about 400° C. to about 550° C., a bulk electric resistivity of at least about $1 \times 10^7$ ohm-cm, and a density of at least about 3.2 $g/cm^3$.

25. The fiber of claim 24 the wherein the FeO is present in an amount of at least about 12 to about 15 Mole %.

26. A bulk conducting glass composition comprising: $P_2O_5$, $V_2O_5$, PbO, FeO, each having a molar percentage, the ratio of the molar percentage of $P_2O_5$ to $V_2O_5$ being in the range of greater than 1 to about 6, and the $P_2O_5$ and $V_2O_5$ being present in an aggregate amount of at least 50 Mole % and MnO and/or $Sb_2O_3$ in an aggregate amount of at least 1%, the $P_2O_5$, $V_2O_5$, PbO, FeO, MnO and/or $Sb_2O_3$ being present in amounts sufficient to produce a glass having bulk resistivity and workability into fibers.

27. The glass composition of claim 26 wherein at least one of MnO and $Sb_2O_3$ is present in an amount of at most 2 Mole %.

28. A bulk conducting glass composition comprising: $P_2O_5$, $V_2O_5$, PbO, and FeO, each having a molar percentage, the ratio of the molar percentage of $P_2O_5$ to $V_2O_5$ being in the range of greater than 1 to about 6, and the $P_2O_5$ and $V_2O_5$ being present in an aggregate amount of at least 50 Mole %, the PbO being present in the glass in an amount in excess of 16 Mole %, and the FeO being present in amount of about 0–30% Mole %, the composition also including MnO and/or $Sb_2O_3$ in an aggregate amount of up to 2 Mole %.

* * * * *